(12) United States Patent
Huang et al.

(10) Patent No.: US 9,685,883 B2
(45) Date of Patent: Jun. 20, 2017

(54) THREE-LEVEL RECTIFIER

(71) Applicant: Delta Electronics (Shanghai) Co., Ltd., Shanghai (CN)

(72) Inventors: Jian-Gang Huang, Shanghai (CN); Bing Zhang, Shanghai (CN); Yang-Yang Tao, Shanghai (CN); Sen-Lin Wen, Shanghai (CN); Li-Feng Qiao, Shanghai (CN); Hong-Jian Gan, Shanghai (CN); Jian-Ping Ying, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 36 days.

(21) Appl. No.: 14/719,285

(22) Filed: May 21, 2015

(65) Prior Publication Data
US 2015/0340963 A1 Nov. 26, 2015

(30) Foreign Application Priority Data

May 23, 2014 (CN) .......................... 2014 1 0222309

(51) Int. Cl.
*H02M 7/487* (2007.01)
*H02M 7/5387* (2007.01)
(Continued)

(52) U.S. Cl.
CPC ........... *H02M 7/219* (2013.01); *H02M 7/003* (2013.01); *H02M 7/217* (2013.01); *H02M 7/487* (2013.01)

(58) Field of Classification Search
CPC ........ H02M 7/003; H02M 7/06; H02M 7/217; H02M 7/42; H02M 7/44; H02M 7/48;
(Continued)

(56) References Cited

U.S. PATENT DOCUMENTS 5,459,655 A * 10/1995 Mori ....................... H01L 23/04
257/E23.14
6,028,779 A * 2/2000 Sakamoto ............. H02M 7/003
363/132

(Continued)

FOREIGN PATENT DOCUMENTS

CN 1108657 C 5/2003
CN 102882385 A 1/2013
(Continued)

*Primary Examiner* — Gary L Laxton
*Assistant Examiner* — Ivan Laboy Andino
(74) *Attorney, Agent, or Firm* — CKC & Partners Co., Ltd.

(57) ABSTRACT

A three-level rectifier includes at least one phase bridge arm that includes an upper-half and a lower-half bridge arm circuit modules. The upper-half bridge arm circuit module includes a first diode unit and a second diode unit that are in series connection, and a first power semiconductor switch unit. The lower-half bridge arm circuit module includes a third diode unit and a fourth diode unit that are in series connection, and a second power semiconductor switch unit. These first and second power semiconductor switch units are connected to the neutral point of the capacitor unit; the second diode unit and the third diode unit are connected to the alternating-current terminal; the first diode unit and the fourth diode unit are respectively connected to the positive terminal and negative terminal of the direct-current bus. The two circuit modules are disposed side by side and facing each other.

13 Claims, 7 Drawing Sheets

(51) Int. Cl.
*H02M 7/219* (2006.01)
*H02M 7/00* (2006.01)
*H02M 7/217* (2006.01)

(58) Field of Classification Search
CPC ........ H02M 7/483; H02M 7/487; H02M 7/49; H02M 7/537; H02M 7/5387; H02M 7/5388
USPC ........ 363/16–17, 34–43, 84–89, 95–98, 125, 363/127, 131–132, 135–136, 144
See application file for complete search history.

(56) References Cited

U.S. PATENT DOCUMENTS

| | | | | |
|---|---|---|---|---|
| 6,456,516 | B1* | 9/2002 | Bruckmann | H02M 7/003 363/144 |
| 6,728,120 | B1* | 4/2004 | Greif | H02M 5/4585 363/40 |
| 8,934,277 | B2* | 1/2015 | Chen | H02M 7/537 363/132 |
| 2006/0274561 | A1* | 12/2006 | Ahmed | H02M 7/003 363/132 |
| 2010/0315776 | A1* | 12/2010 | Ono | H02M 7/487 361/689 |
| 2011/0216561 | A1* | 9/2011 | Bayerer | H01L 25/162 363/71 |
| 2012/0092914 | A1 | 4/2012 | Viitanen | |
| 2012/0120698 | A1* | 5/2012 | Viitanen | H02M 7/487 363/126 |
| 2013/0063067 | A1* | 3/2013 | Tanaka | H01L 25/07 318/494 |
| 2013/0342019 | A1* | 12/2013 | Wagoner | H02M 7/483 307/82 |
| 2014/0111959 | A1* | 4/2014 | Li | H05K 7/026 361/809 |
| 2014/0254228 | A1* | 9/2014 | Ying | H02M 7/5387 363/132 |
| 2015/0078052 | A1* | 3/2015 | Kobayashi | H02M 7/537 363/131 |
| 2015/0222201 | A1* | 8/2015 | Nakashima | H02M 7/537 363/131 |

FOREIGN PATENT DOCUMENTS

| | | |
|---|---|---|
| CN | 203104253 U | 7/2013 |
| TW | 303543 B | 4/1997 |
| TW | 201347375 A | 11/2013 |

* cited by examiner

- - - - - - - Path before alternation
— · — · — · — Path after alternation
· · · · · · · · · · · Commutation loop

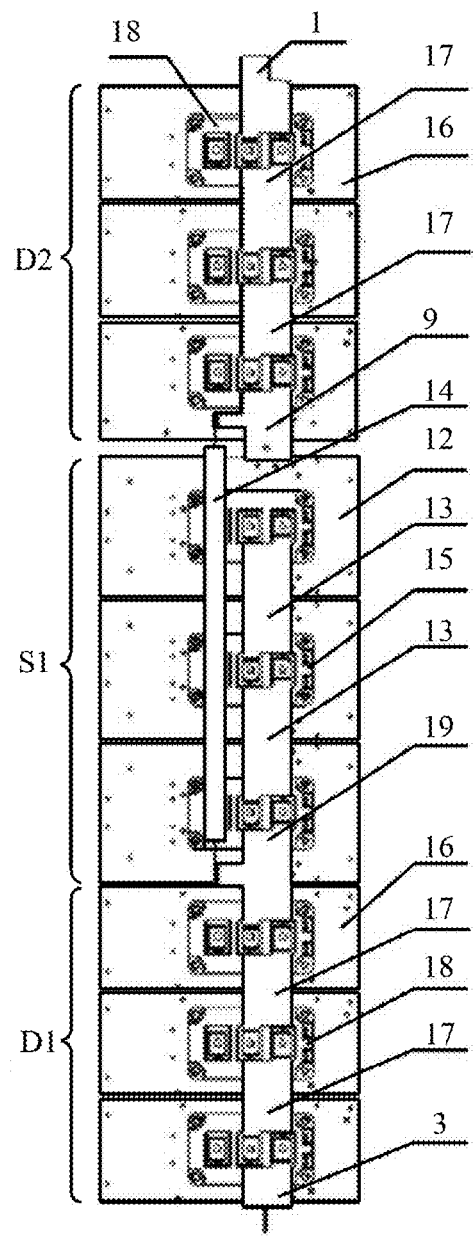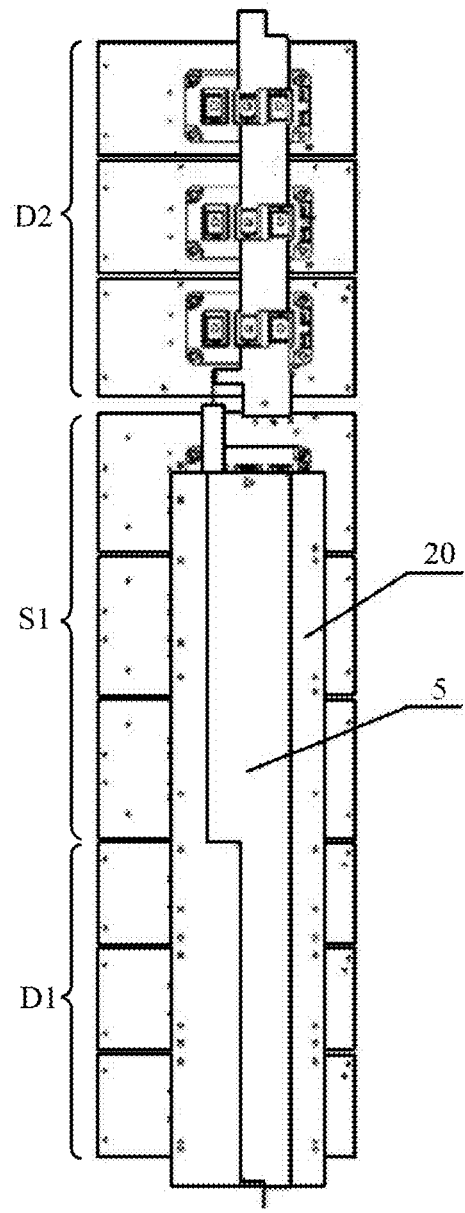
Fig. 6A
Fig. 6B

THREE-LEVEL RECTIFIER

RELATED APPLICATIONS

This application claims priority to China Application Serial Number 201410222309.5, filed May 23, 2014, which is herein incorporated by reference.

BACKGROUND

Field of Invention

The present invention relates to rectifiers. More particularly, the present invention relates to three-level rectifiers.

Description of Related Art

Medium or high voltage inverters configured in fans, pumps, compressors, and rolling mills are widely used in large mining production, petrochemical, municipal water supply, iron and steel metallurgy, electric power and other industries for improving energy savings.

A rectifier unit is an important part of the medium or high voltage inverter. Diodes that are not controlled for rectification has a simple structure and reliable and low cost advantages, but it results in large network harmonic waves. The phase shifting and voltage transformation can be used to reduce these harmonic waves, but greatly increases the system cost. Three-level technology effectively reduces the voltage stress of switching devices, and improves the harmonic waves and electro-magnetic interference (EMI), but the increase of the number of the semiconductor switching devices makes the control more complex.

Power semiconductor devices such as insulated gate bipolar transistors (IGBT) are widely used in the field of the medium or high voltage inverters. However, the voltage level of the high-voltage power semiconductor devices is limited, and the higher voltage level needs higher costs with poorer switching performance.

Low-voltage power semiconductor devices (e.g., IGBT) directly connected in series can effectively solve above problem. Due to the higher power and voltage levels, more power semiconductor switch modules and diode modules are connected in series to form each phase bridge arm of the conventional rectifier. In this way, the bridge arm has larger volume, and it is difficult to be installed and maintained; the stray inductance of a large commutation loop deteriorates the voltage stress of the switching devices and EMI of the system.

SUMMARY

The following presents a simplified summary of the disclosure in order to provide a basic understanding to the reader. This summary is not an extensive overview of the disclosure and it does not identify key/critical components of the present invention or delineate the scope of the present invention. Its sole purpose is to present some concepts disclosed herein in a simplified form as a prelude to the more detailed description that is presented later.

In one aspect, the present disclosure provides three-level rectifiers with high power density, high reliability, and small stray inductance. The three-level rectifiers are easy to be installed and maintained with low-voltage power semiconductor devices connected in series.

In one embodiment, a three-level rectifier includes at least one phase bridge arm, and the at least one phase bridge arm includes an upper-half bridge arm circuit module and a lower-half bridge arm circuit module. The upper-half bridge arm circuit module includes a first power semiconductor switch unit, a first diode unit, a second diode unit, a first connecting busbar, a first insulated wire and a first transfer busbar. The first diode unit is connected to the second diode unit in series, the first diode unit is connected to a positive terminal of a direct-current bus, the first connecting busbar is connected to the first power semiconductor switch unit and the first diode unit, the first transfer busbar is connected to the second diode unit, and the first insulated wire is connected to the first transfer busbar and the first connecting busbar. The lower-half bridge arm circuit module includes a second power semiconductor switch unit, a third diode unit, a fourth diode unit, a second connecting busbar, a second insulated wire and a second transfer busbar. The third diode unit is connected to the fourth diode unit in series, the first power semiconductor switch unit and the second power semiconductor switch unit both are connected to a neutral point of a capacitor unit, the second diode unit and the third diode unit are connected to an alternating-current terminal, the fourth diode unit is connected to a negative terminal of the direct-current bus, the capacitor unit is connected between the positive terminal of the direct-current bus and the negative terminal of the direct-current bus, the second connecting busbar is connected to the second power semiconductor switch unit and the fourth diode unit, the second transfer busbar is connected to the third diode unit, the second insulated wire is connected to the second connecting busbar and the second transfer busbar, and the upper-half bridge arm circuit module and the lower-half bridge arm circuit module are disposed side by side and facing each other.

In view of the foregoing, the technical solutions of the present disclosure result in significant advantageous and beneficial effects, compared with existing techniques. The implementation of the above-mentioned technical solutions achieves substantial technical improvements and provides utility that is widely applicable in the industry. Specifically, technical advantages generally attained, by embodiments of the present disclosure, include:

1. The proposed modular design uses half of the bridge arm as a module, and the upper-half bridge arm circuit and the lower-half bridge arm circuit are disposed side by side and facing each other; thereby facilitating the installation and replacement procedures and resulting in a compact structure with a smaller commutation loop and reduced stray inductance; and
2. The connecting elements are composed of a combination of connecting busbars (i.e., those made of conductive materials; such as copper busbar or aluminum) and insulated wires (i.e., insulated cables), as compared with other products in which all the connecting elements are busbars; in this way, the present disclosure effectively avoid the problem of local discharge (or partial discharge) resulted from the high-voltage during the connecting process of the system.

Many of the attendant features will be more readily appreciated, as the same becomes better understood by reference to the following detailed description considered in connection with the accompanying drawings.

BRIEF DESCRIPTION OF THE DRAWINGS

The present description will be better understood from the following detailed description read in light of the accompanying drawing, wherein:

FIG. 6A and FIG. 6B respectively illustrate the circuit structure layout and connecting wires of an upper-half bridge arm according to one embodiment of the present disclosure;

DETAILED DESCRIPTION

Figure 1:
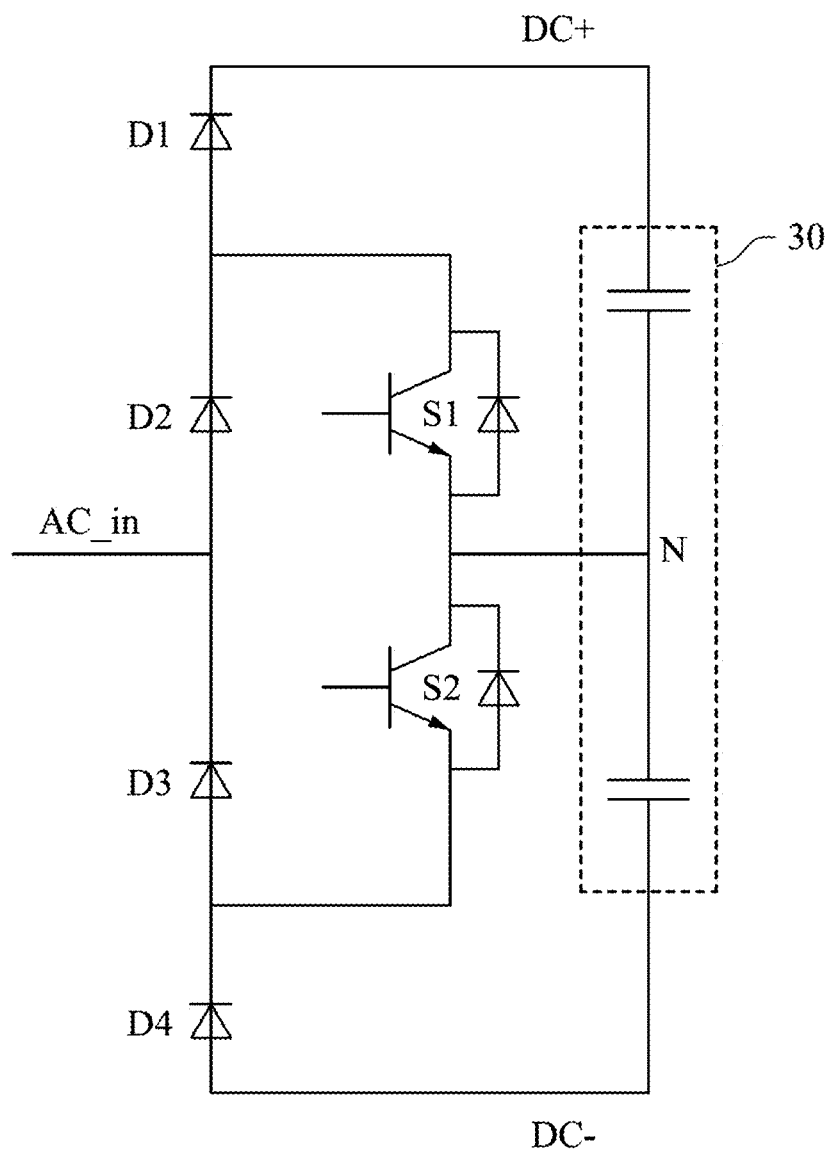
FIG. 1 is a schematic diagram illustrating the circuit of a three-level rectifier (single phase)

In the following detailed description, for purposes of explanation, numerous specific details are set forth in order to attain a thorough understanding of the disclosed embodiments. In accordance with common practice, the various described features/elements are not drawn to scale but instead are drawn to best illustrate specific features/elements relevant to the present invention. Also, like reference numerals and designations in the various drawings are used to indicate like elements/parts. Moreover, well-known structures and devices are schematically shown in order to simplify the drawing and to avoid unnecessary limitation to the claimed invention.

The technical solution of the present disclosure is directed to a three-level rectifier which could be used in frequency converters or widely applied in other related technical contexts. The component layout and connection framework of single phase bridge arm of the three-level rectifier are discussed herein below in connection with FIG. 1 to FIG. 8.

Figure 2:
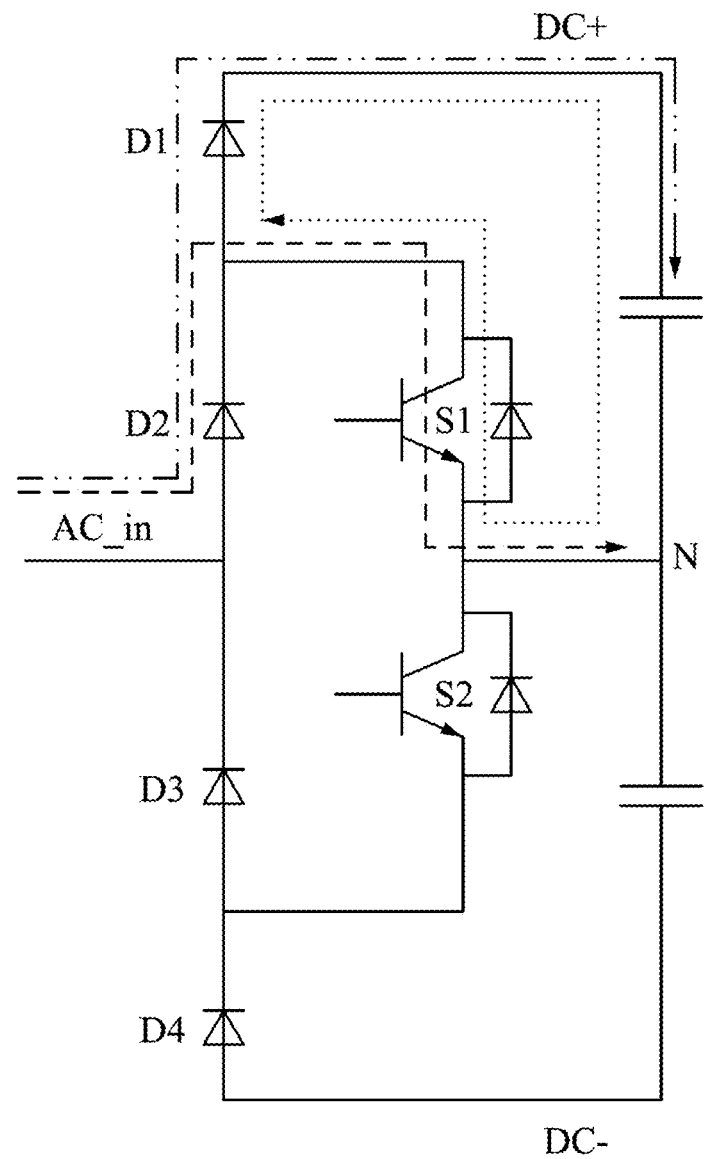
FIG. 2 illustrates one commutation loop of the three-level rectifier of FIG. 1.

FIG. 1 is a schematic diagram illustrating the circuit of a three-level rectifier (single phase). As illustrated in FIG. 1, the three-level rectifier includes a first diode unit D1, a second diode unit D2, a third diode unit D3, a fourth diode unit D4, a first power semiconductor switch unit S1 and a second power semiconductor switch unit S2. In structure, the first diode unit D1 is connected to the second diode unit D2 in series, and the first power semiconductor switch unit S1 is electrically connected to the first diode unit D1 and the second diode unit D2; the third diode unit D3 is connected to the fourth diode unit D4 in series, and the second power semiconductor switch unit S2 is electrically connected to the third diode unit D3 and the fourth diode unit D4. The first power semiconductor switch unit S1 and the second power semiconductor switch unit S2 are connected to the neutral point N of the capacitor unit 30, the second diode unit D2 and the third diode unit D3 are connected to the alternating-current terminal AC in, the first diode unit D1 is connected to the positive terminal DC+ of the direct-current bus, the fourth diode unit D4 is connected to the negative terminal DC− of the direct-current bus. In operation, FIG. 2 schematically depicts a commutation loop of the three-level rectifier. It should be noted that the three-level rectifier comprises various commutation loops, and FIG. 2 shows a commutation loop for illustrative purposes only. As could be appreciated, the commutation loops of the three-level converter are well-known to persons having ordinary skill in the art, and they are not sought to be protected in the present disclosure; accordingly, detailed description thereof is omitted herein.

Figure 3:
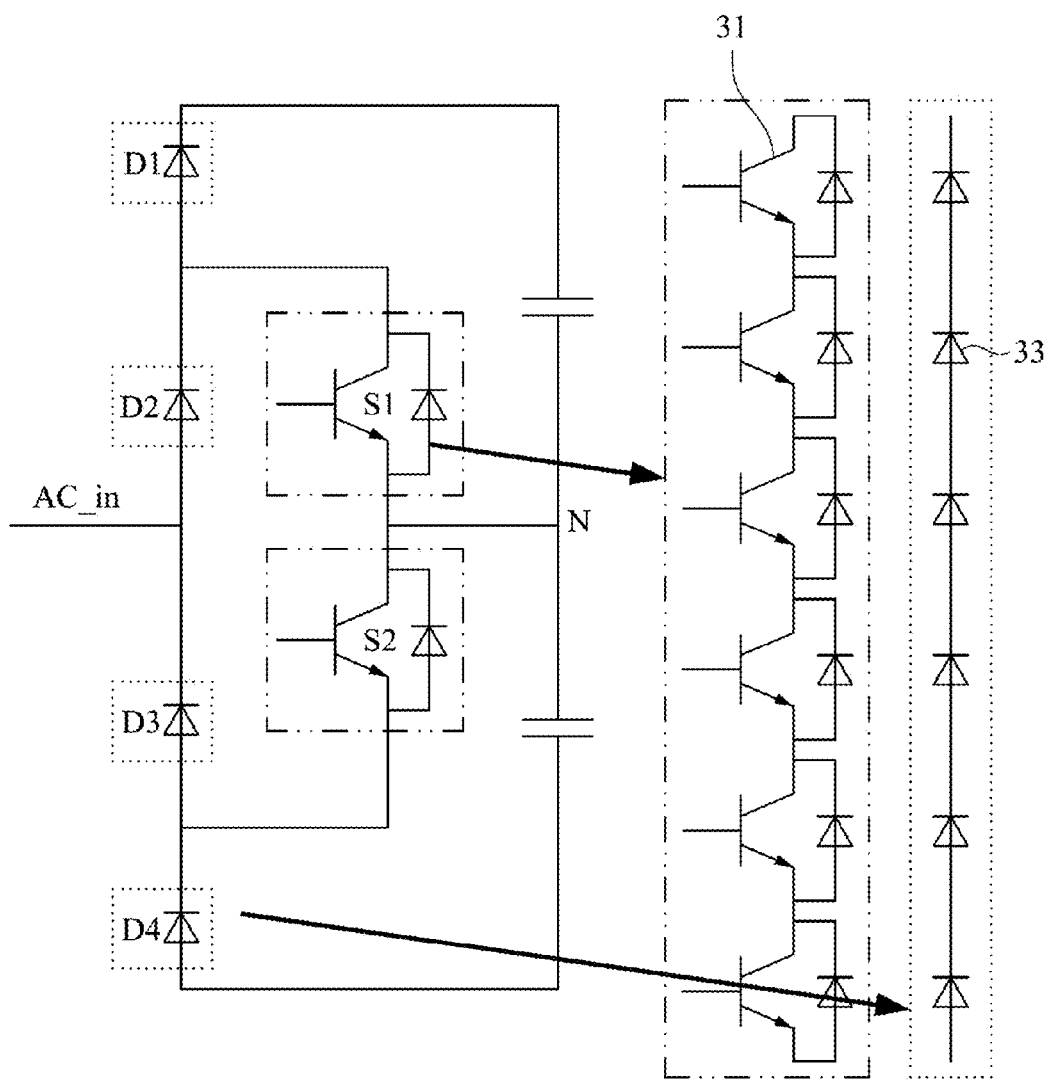
FIG. 3 is a schematic diagram illustrating a power semiconductor switch series circuit and a diode series circuit according to one embodiment of the present disclosure.

FIG. 3 is a schematic diagram illustrating a power semiconductor switch series circuit and a diode series circuit according to one embodiment of the present disclosure. As illustrated in FIG. 3, each power semiconductor switch unit includes a plurality of power semiconductor switches 31 connected in series (e.g., six switches as shown in FIG. 3), and each diode unit includes a plurality of diodes. It should be noted that the first diode unit D1, the second diode unit D2, the third diode unit D3 and the fourth diode unit D4 in structure are substantially equal to each other and each diode unit includes a plurality of diodes 33 connected in series.

Figure 4:
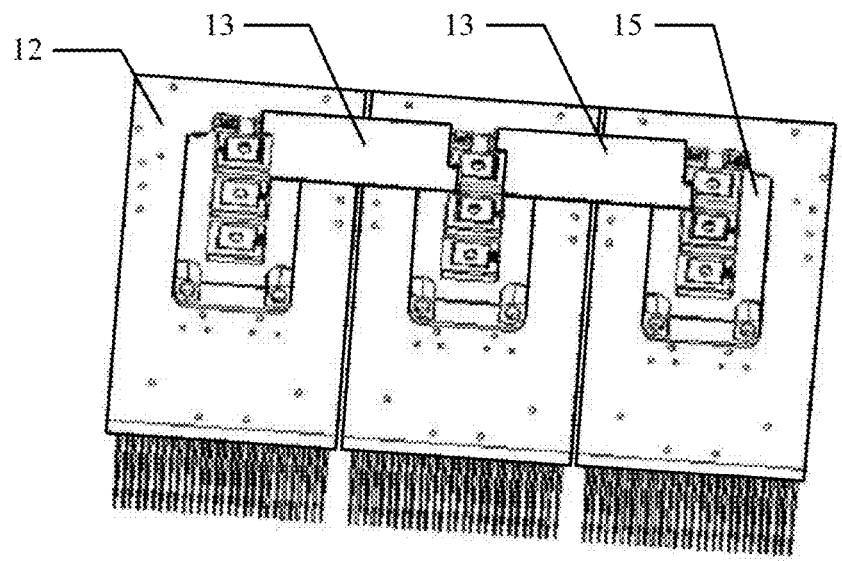
FIG. 4 is a structural diagram illustrating a power semiconductor switch unit according to one embodiment of the present disclosure.

The structures of the power semiconductor switch units S1 and S2 are shown in FIG. 4, the power semiconductor switch unit includes a plurality of power semiconductor switch modules 15 (e.g., three module as shown in FIG. 4) and a plurality of series busbars 13, and the power semiconductor switch modules 15 are connected in series through the series busbar 13. In one embodiment, each power semiconductor switch module 15 includes two power semiconductor switches connected in series; in other words, all of the power semiconductor switch modules 15 in each power semiconductor switch unit have six power semiconductor switches 31 connected in series. The power semiconductor switch is a full-controlled device, such as IGBT, but is not limited thereto. It should be noted that the busbars are manufactured from conductive materials such as copper and aluminum. For the sake of illustration, the description herein below uses the busbar as an example. Further, the power semiconductor switch module 15 is disposed on the heat dissipator 12.

Figure 5:
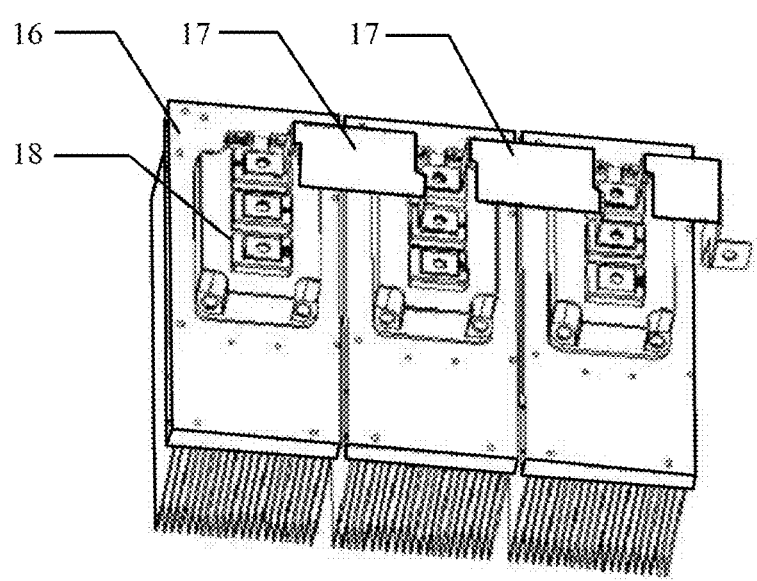
FIG. 5 is a structural diagram illustrating a diode unit according to one embodiment of the present disclosure.

The structure of any of the first diode unit D1, the second diode unit D2, the third diode unit D3 and the fourth diode unit D4 is shown in FIG. 5, the diode modules 18 are connected in series through the series busbar 17 and disposed on the heat dissipator 16. Each diode module 18 includes two diodes connected in series; in other words, all of the diode modules 18 in each diode unit have six diodes 33 connected in series, as shown in FIG. 3.

As could be appreciated, although the above discussion is directed to six series-connected components, the present disclosure is not limited thereto. In practice, persons having ordinary skill in the art would adjust the number of the components as desired.

Figure 7A:
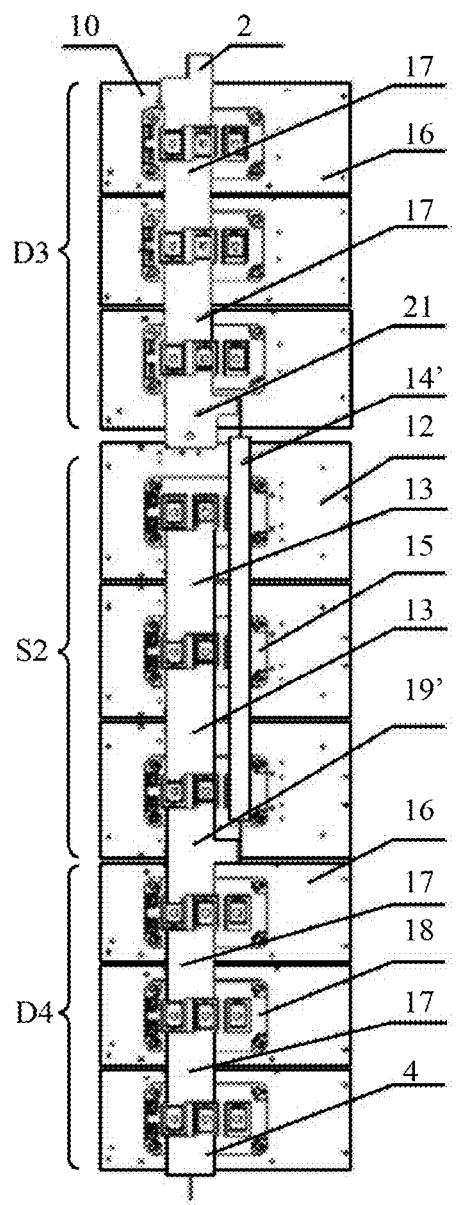
FIG. 7A and FIG. 7B respectively illustrate the circuit structure layout and connecting wires of a lower-half bridge arm according to one embodiment of the present disclosure.
Figure 7B:
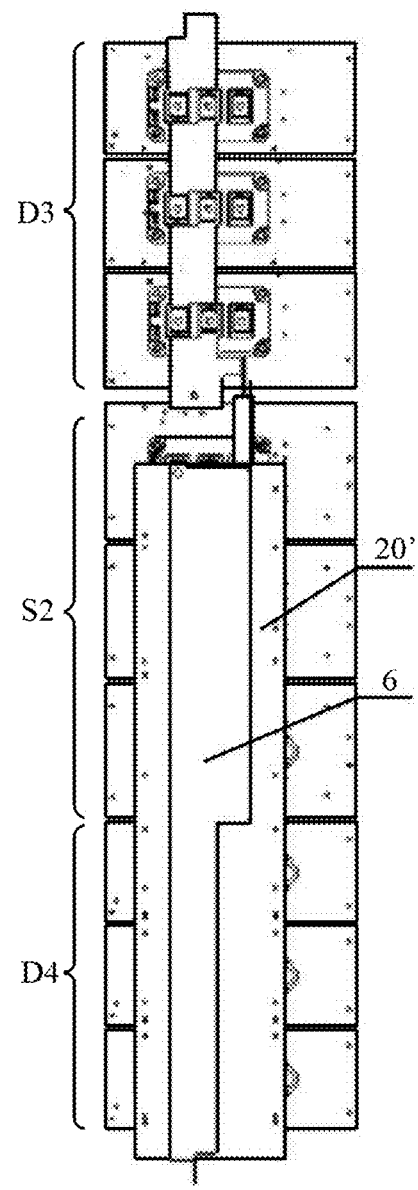
Figure 8:
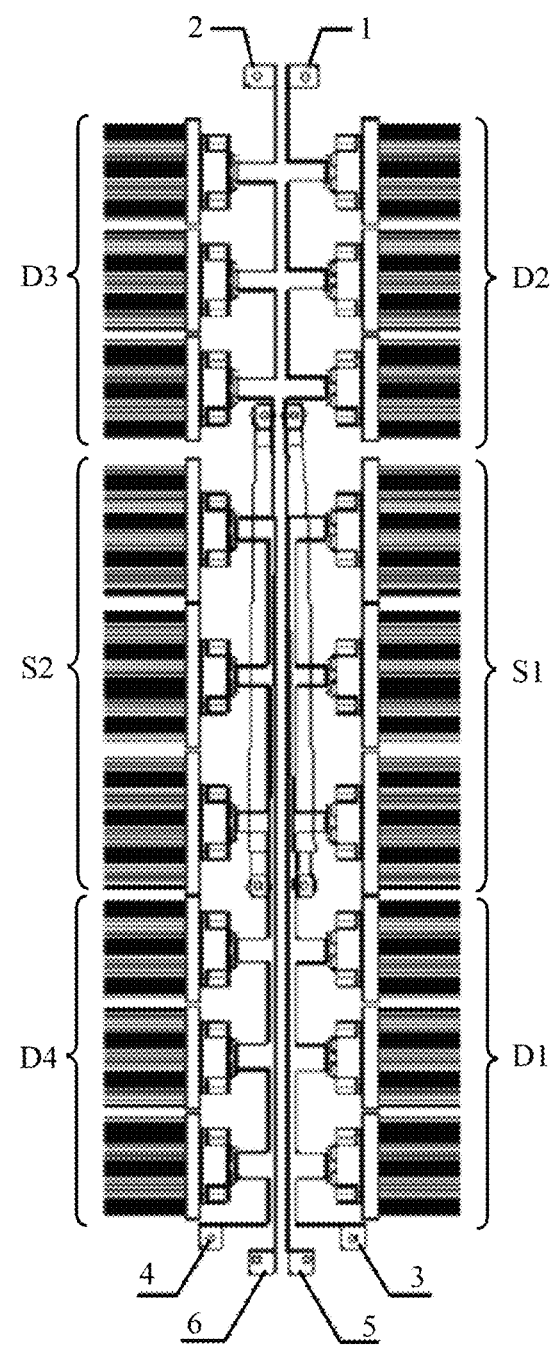
FIG. 8 is a structural diagram illustrating a single-phase bridge arm of the three-level rectifier according to one embodiment of the present disclosure.

In one embodiment, the structural design of the overall bridge arm is illustrated in FIG. 8. The structure of the upper-half bridge arm is depicted in FIG. 6A and FIG. 6B, and the upper-haft bridge arm circuit module comprises the first diode unit D1, the second diode unit D2 and the first power semiconductor switch unit S1. The structure of the lower-half bridge arm is depicted in FIG. 7A and FIG. 7B, and the lower-half bridge arm circuit module comprises the third diode unit D3, the fourth diode unit D4 and the second power semiconductor switch unit S2.

In structural design, the second diode unit D2 is disposed at the upper portion of the upper-half bridge arm, the first power semiconductor switch unit S1 is disposed at the middle portion of the upper-half bridge arm, whereas the first diode unit D1 is disposed at the lower portion of the upper-half bridge arm; the fourth diode unit D4 is disposed correspondingly to the position of D1 and is located at the lower portion of the lower-half bridge arm, the second power semiconductor switch unit S2 is disposed correspondingly to the position of S1 and is located at the middle portion of the lower-half bridge arm, whereas the third diode unit D3 is disposed correspondingly to the position of D2 and is located at the upper portion of the lower-half bridge arm. The upper-half bridge arm circuit module and the lower-half bridge arm circuit module are disposed side by side and facing each other in a substantially mirror relationship, and the thus-obtained overall structure is U-shape.

More specifically, the whole bridge arm as illustrated in FIG. 8, the first diode unit D1 faces the fourth diode unit D4, the first power semiconductor switch unit S1 faces the second power semiconductor switch unit S2, and the second diode unit D2 faces the third diode unit D3. The upper-half bridge arm circuit module as illustrated in FIG. 6A and FIG. 6B, the first power semiconductor switch unit S1 is positioned between the first diode unit D1 and the second diode unit D2, and the first diode unit D1, the first power semiconductor switch unit S1 and the second diode unit D2 are arranged in a straight line; similarly, the lower-half bridge arm circuit module as depicted in FIG. 7A and FIG. 7B, the second power semiconductor switch unit S2 is positioned between the third diode unit D3 and the fourth diode unit D4, and the fourth diode unit D4, the second power semiconductor switch unit S2 and the third diode unit D3 are arranged in a straight line.

In view of the foregoing, the present disclosure provides a novel component layout of the three-level rectifier. The characteristics of the present layout include: providing a modular design using half bridge arm as a module, and the upper-half bridge arm circuit and the lower-half bridge arm circuit being disposed side by side and facing each other, thereby facilitating the installation and replacement thereof, and resulting in a compact structure, reducing the commutation loop area of the rectifier and decreasing the stray inductance.

Another feature of the structure provided by the present disclosure is the way in which the components are connected. The connection arrangement of the upper-half bridge arm, in the three-level rectifier are illustrated in FIGS. 6A and 6B. Specifically, FIG. 6A shows the first layer structure, in which the first connecting busbar 19 is connected to the first power semiconductor switch unit S1 and the first diode unit D1, the first transfer busbar 9 is connected to the second diode unit D2, the first insulated wire (e.g., an insulated wire resistant to partial discharge) 14 is connected to the first transfer busbar 9 and the first connecting busbar 19, the positive conductor of the direct-current bus 3 connects the first diode unit D1 to the positive terminal DC+ of the direct-current bus (shown in FIG. 1), and the first alternating-current connecting busbar 1 connects the second diode unit D2 to the alternating-current terminal AC in (shown in FIG. 1). FIG. 6B shows the second layer structure, in which the first neutral point connecting busbar 5 is connected to the first power semiconductor switch unit S1 and the neutral point N of the capacitor unit 30 (shown in FIG. 1), the insulating board 20 is disposed on the first power semiconductor switch unit S1 and the first diode unit D1, and the first neutral point connecting busbar 5 is disposed on the insulating board 20, so that the first neutral point connecting busbar 5 can be electrically isolated from the other conductors of the upper-half bridge arm.

In one embodiment, the connection arrangement of the lower-half bridge arm is shown in FIGS. 7A and 7B. Specifically, FIG. 7A shows the first layer structure, in which the second connecting busbar 19' is connected to the second power semiconductor switch unit S2 and the fourth diode unit D4, the second transfer busbar 21 is connected to the third diode unit D3, the second insulated wire 14' is connected to the second connecting busbar 19' and the second transfer busbar 21, the negative conductor of the direct-current bus 4 connects the fourth diode unit D4 to the negative terminal DC− of the direct-current bus, the second alternating-current connecting busbar 2 connects the third diode unit D3 to the alternating-current terminal AC in (shown in FIG. 1). FIG. 7B shows the second layer structure, in which the second neutral point connecting busbar 6 is connected to the second power semiconductor switch unit S2 and the neutral point N of the capacitor unit 30 (shown in FIG. 1), the insulating board 20' is disposed on the second power semiconductor switch unit S2 and the fourth diode unit D4, and the second neutral point connecting busbar 6 is disposed on the insulating board 20', so that the second neutral point connecting busbar 6 can be electrically isolated from the other conductors of the lower-half bridge arm.

Specifically, the whole bridge arm is illustrated in FIG. 8, in which the upper-half bridge arm circuit module comprises the second diode unit D2, the first diode unit D1 and the first power semiconductor switch unit S1 sequentially connected to the first alternating-current connecting busbar 1, the positive conductor of the direct-current bus 3 and the first neutral point connecting busbar 5, wherein the first alternating-current connecting busbar 1 can be electrically connected to the alternating-current terminal AC in (shown in FIG. 1), the positive conductor of the direct-current bus 3 can be electrically connected to the positive terminal DC+ of the direct-current bus (shown in FIG. 1), the first neutral point connecting busbar 5 can be electrically connected to the neutral point N of the capacitor unit 30 (shown in FIG. 1). The lower-half bridge arm circuit module comprises the third diode unit D3, the fourth diode unit D4 and the second power semiconductor switch unit S2 sequentially connected to the second alternating-current connecting busbar 2, the negative conductor of the direct-current bus 4 and the second neutral point connecting busbar 6, wherein the second alternating-current connecting busbar 2 can be electrically connected to the alternating-current terminal AC in (shown in FIG. 1), the negative conductor of the direct-current bus 4 can be electrically connected to the negative terminal DC− of the direct-current bus (shown in FIG. 1), and the second neutral point connecting busbar 6 can be electrically connected to the neutral point N of the capacitor unit 30 (shown in FIG. 1).

In view of the foregoing, the connection framework provided by the present disclosure has the following characteristics: the connecting elements are composed of a combination of connecting busbars (such as the copper busbar) and insulated wires, as compared with other products and patents in which all the connecting elements are busbars; in this way, the present disclosure effectively avoid the problem of partial discharge resulted from the high-voltage during the connecting process of the system; there are only two layers of connecting busbar for connecting the half bridge arms, the structure is simple and the manufacturing cost is reduced.

Although various embodiments of the invention have been described above with a certain degree of particularity, or with reference to one or more individual embodiments, they are not limiting to the scope of the present disclosure. Those with ordinary skill in the art could make numerous alterations to the disclosed embodiments without departing from the spirit or scope of this invention. Accordingly, the protection scope of the present disclosure shall be defined by the accompany claims.

What is claimed is:

1. A three-level rectifier comprising at least one phase bridge arm, and the at least one phase bridge arm comprising:
an upper-half bridge arm circuit module comprising a first power semiconductor transistor unit, a first diode unit without connecting any switch in parallel, a second diode unit without connecting any switch in parallel, a first connecting busbar, a first insulated wire and a first transfer busbar, the first diode unit connected to the second diode unit in series, the first diode unit connected to a positive terminal of a direct-current bus, the first connecting busbar connected to the first power semiconductor transistor unit and the first diode unit, the first transfer busbar connected to the second diode unit, and the first insulated wire connected to the first transfer busbar and the first connecting busbar; and
a lower-half bridge arm circuit module comprising a second power semiconductor transistor unit, a third diode unit without connecting any switch in parallel, a fourth diode unit without connecting any switch in parallel, a second connecting busbar, a second insulated wire and a second transfer busbar, the third diode unit connected to the fourth diode unit in series, the first power semiconductor transistor unit and the second power semiconductor transistor unit both connected to a neutral point of a capacitor unit, the second diode unit and the third diode unit connected to an alternating-current terminal, the fourth diode unit connected to a negative terminal of the direct-current bus, the capacitor unit connected between the positive terminal of the direct-current bus and the negative terminal of the direct-current bus, the second connecting busbar connected to the second power semiconductor transistor unit and the fourth diode unit, the second transfer busbar connected to the third diode unit, the second insulated wire connected to the second connecting busbar and the second transfer busbar, and the upper-half bridge arm circuit module and the lower-half bridge arm circuit module disposed side by side and facing each other.

2. The three-level rectifier of claim 1, wherein each of the first power semiconductor transistor unit and the second power semiconductor transistor unit comprises a plurality of power semiconductor transistor modules and a plurality of series busbars, the power semiconductor transistor modules are connected in series through the series busbar, and the power semiconductor transistor modules include a plurality of power semiconductor transistors.

3. The three-level rectifier of claim 1, wherein each of the first diode unit, the second diode unit, the third diode unit and the fourth diode unit comprises a plurality of diode modules and a plurality of series busbars, the diode modules are connected in series through the series busbars, and the diode modules include a plurality of diodes.

4. The three-level rectifier of claim 1, wherein the first diode unit faces the fourth diode unit, the first power semiconductor transistor unit faces the second power semiconductor transistor unit, and the second diode unit faces the third diode unit.

5. The three-level rectifier of claim 1, wherein the first diode unit, the first power semiconductor transistor unit and the second diode unit are arranged in a straight line, and the first power semiconductor transistor unit is positioned between the first diode unit and the second diode unit; the fourth diode unit, the second power semiconductor transistor unit and the third diode unit are arranged in a straight line, and the second power semiconductor transistor unit is positioned between the fourth diode unit and the third diode unit.

6. The three-level rectifier of claim 1, wherein the upper-half bridge arm circuit module further comprises a positive conductor of the direct-current bus that connects the first diode unit to the positive terminal of the direct-current bus.

7. The three-level rectifier of claim 1, wherein the upper-half bridge arm circuit module further comprises a first alternating-current connecting busbar that connects the second diode unit to the alternating-current terminal.

8. The three-level rectifier of claim 1, wherein the upper-half bridge arm circuit module further comprises a first neutral point connecting busbar that connects the first power semiconductor transistor unit to the neutral point of the capacitor unit.

9. The three-level rectifier of claim 8, wherein the upper-half bridge arm circuit module further comprises an insulating board disposed on the first power semiconductor transistor unit and the first diode unit, and the first neutral point connecting busbar is disposed on the insulating board.

10. The three-level rectifier of claim 1, wherein the lower-half bridge arm circuit module further comprises a negative conductor of the direct-current bus that connects the fourth diode unit to the negative terminal of the direct-current bus.

11. The three-level rectifier of claim 1 wherein the lower-half bridge arm circuit module further comprises a second alternating-current connecting busbar that connects the third diode unit to the alternating-current terminal.

12. The three-level rectifier of claim 1, wherein the lower-half bridge arm circuit module further comprises a second neutral point connecting busbar that connects the second power semiconductor transistor unit to the neutral point of the capacitor unit.

13. The three-level rectifier of claim 12, wherein the lower-half bridge arm circuit module further comprises an insulating board disposed on the second power semiconductor transistor unit and the fourth diode unit, and the second neutral point connecting busbar is disposed on the insulating board.

* * * * *